(12) United States Patent
Kimoto (10) Patent No.: US 7,297,438 B2
(45) Date of Patent: Nov. 20, 2007

(54) COOLING DEVICE FOR BATTERY PACK (75) Inventor: Shinya Kimoto, Toyohashi (JP)

(73) Assignee: Panasonic EV Energy Co., Ltd., Shizuoka (JP)

( * ) Notice: Subject to any disclaimer, the term of this patent is extended or adjusted under 35 U.S.C. 154(b) by 666 days.

(21) Appl. No.: 10/785,989

(22) Filed: Feb. 26, 2004

(65) Prior Publication Data

US 2004/0180257 A1 Sep. 16, 2004

(30) Foreign Application Priority Data

Mar. 11, 2003 (JP) .............................. 2003-065077

(51) Int. Cl.
*H01M 10/50* (2006.01)
(52) U.S. Cl. ..................................... 429/120
(58) Field of Classification Search ................. 429/120
See application file for complete search history.

(56) References Cited

U.S. PATENT DOCUMENTS

| 6,709,783 | B2 | 3/2004 | Ogata et al. |
| 2003/0211384 | A1 | 11/2003 | Hamada et al. |
| 2004/0004461 | A1 | 1/2004 | Hamada et al. |

FOREIGN PATENT DOCUMENTS

| JP | 07014616 A | * | 1/1995 |
| JP | 2001-76771 | | 3/2001 |
| JP | 2001-167803 | | 6/2001 |
| JP | 2002-134177 | | 5/2002 |

OTHER PUBLICATIONS

Machine translation of JP 2001-076771 A.*
English Language Abstract of JP 2001-167803.
English Language Abstract of JP 2001-76771.
English Language Abstract of JP 2002-134177.

* cited by examiner

*Primary Examiner*—Gregg Cantelmo
(74) *Attorney, Agent, or Firm*—Workman Nydegger (57) ABSTRACT

In a battery pack including a plurality of rechargeable batteries arranged in parallel so as to interpose cooling medium paths therebetween, a cooling medium feeding device for feeding a cooling medium to the cooling medium paths is provided. One end of a heat pipe is thermally connected to the downstream side of the battery pack in the flow direction of the cooling medium, whereas the other end of the heat pipe is exposed in a portion having a lower temperature than the downstream side. In this structure, the battery pack is cooled by flow of the cooling medium, while a portion at the downstream side of the cooling medium is cooled with the heat pipe so as to uniformly cool the battery pack.

10 Claims, 9 Drawing Sheets

Prior Art

COOLING DEVICE FOR BATTERY PACK

The present disclosure relates to subject matter contained in priority Japanese Patent Application No. 2003-65077, filed on Mar. 11, 2003, the contents of which is herein expressly incorporated by reference in its entirety.

BACKGROUND OF THE INVENTION

1. Field of the Invention

The present invention relates to a cooling device for a battery pack composed of a plurality of rechargeable batteries arranged in parallel with a cooling medium path interposed therebetween.

2. Description of the Related Art

As a battery pack composed of a plurality of rechargeable batteries, the following type of battery pack is conventionally known so as to prevent a battery temperature from being increased due to heat emission caused by charge and discharge to decrease a battery output, a charge/discharge efficiency or a battery lifetime. A plurality of rechargeable batteries are arranged in parallel with a cooling medium path interposed therebetween. Then, a cooling medium feeding device for feeding a cooling medium to the cooling medium path is provided for the battery pack (for example, see Japanese Patent Laid-Open Publication No. 2001-167803).

Figure 10A:
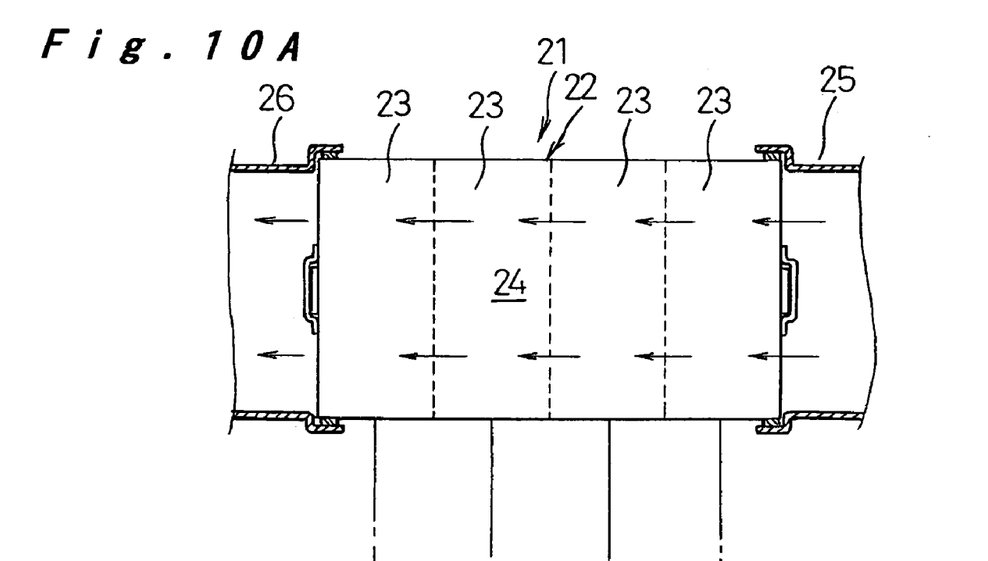
FIG. 10A is a longitudinal sectional front view showing a schematic structure thereof.

As such a type of battery pack, the following battery pack has also been conceived. As shown in FIG. 10A, a rechargeable battery 22 is composed of a plurality of prismatic cells 23 by connecting their short side faces with each other. A plurality of thus constituted rechargeable batteries 22 are arranged in parallel so as to interpose cooling medium paths 24 for allowing a cooling medium to horizontally pass therethrough between the long side faces of the rechargeable batteries 22, thereby constituting a battery pack 21. A feeding hood 25 for feeding the cooling medium is connected to one end of the cooling medium path 24 of the battery pack 21, whereas an exhaust hood 26 is connected to the other end of the cooling medium path 24. In such a structure, the cooling medium is fed in a direction indicated with arrows on the cooling medium path 24 as shown in FIG. 10A.

In addition, the following type of battery pack is also known. In the battery pack, a container is provided so as to house a plurality of rechargeable batteries therein. The container is also thermally connected to circumferential wall surfaces of the rechargeable batteries so as to be in contact therewith. A heat pipe is provided for the container so as to externally dissipate heat transferred from the rechargeable batteries (for example, see Japanese Patent Laid-Open Publication Nos. 2001-76771 and 2002-134177).

Figure 10B:
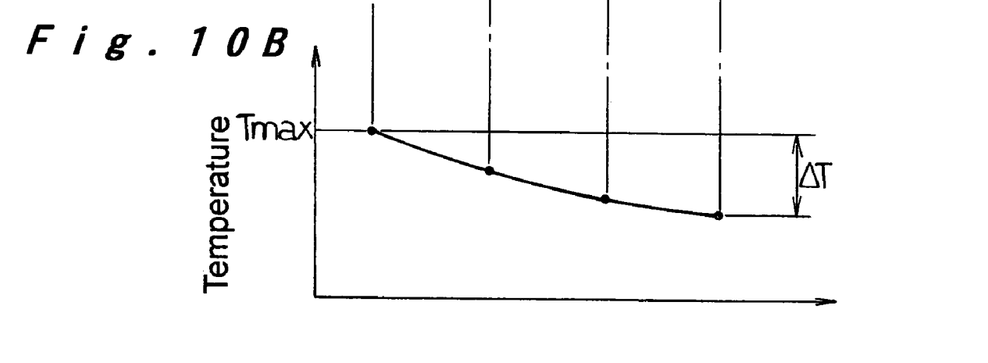
FIG. 10B is a view showing a temperature profile over cells in a rechargeable battery.

In the cooling device of the battery pack 21 having the structure as shown in FIG. 10A, if the cooling medium is allowed to pass through the cooling medium paths 24 between the rechargeable batteries 22 in the direction indicated with the arrows, a temperature of the cooling medium is elevated as the cooling medium passes through the cells 23 to cool them. When the cooling medium reaches the exhaust hood side, the cooling medium has lowered cooling performance. As a result, as shown in FIG. 10B, a temperature of the cell 23 on the downstream side of a flow direction of the cooling medium becomes higher than that of the cell 23 on the upstream side. Thus, a temperature variation $\Delta T$ between the cells 23 in the rechargeable battery 22 is increased. A variation in SOC between the cells 23 is also increased to elevate the maximum temperature Tmax of the cells 23 in the battery pack 21, thereby adversely affecting the lifetime of the battery pack 21.

Moreover, in the structure of externally dissipating the heat generated by the rechargeable batteries housed in the container through the heat pipe as disclosed in Japanese Patent Laid-Open Publication Nos. 2001-76771 and 2002-134177, a large number of heat pipes or a large number of heat collector members are necessitated if cooling performance to efficiently cool all the rechargeable batteries is desired to be obtained. As a result, a space efficiency is disadvantageously lowered to increase the cost. Even though, it is difficult to uniformly cool each of the parts in the rechargeable battery.

SUMMARY OF THE INVENTION

In light of the above-mentioned conventional problems, the present invention has an object of providing a cooling device for a battery pack, which is capable of uniformly cooling each of the rechargeable batteries constituting the battery pack in a compact and inexpensive structure.

A cooling device for a battery pack according to the present invention includes a cooling medium feeding device for feeding a cooling medium to a cooling medium path in a battery pack composed of a plurality of rechargeable batteries arranged in parallel so as to interpose the cooling medium path therebetween, wherein an end of a heat pipe is thermally connected to a downstream side of the battery pack in a flow direction of the cooling medium, whereas the other end of the heat pipe is placed so as to be exposed in a portion of the battery pack having a lower temperature than the downstream side. The cooling medium is made to flow through the cooling medium path provided between the rechargeable batteries so as to cool each of the rechargeable batteries in a compact and inexpensive structure. In addition, the downstream side of the flow direction of the cooling medium where cooling performance may otherwise be lowered is cooled via the heat pipe. Consequently, the entire battery pack is uniformly cooled.

Moreover, the battery pack is configured such that the plurality of rechargeable batteries, each of which is a prismatic battery having rectangular long side faces and composed of a plurality of cells arranged along a longitudinal direction of the long side faces of the rechargeable battery, are arranged in parallel so as to interpose the cooling medium path between the long side faces of the rechargeable batteries. The battery pack is provided with the cooling medium feeding device for feeding the cooling medium along the longitudinal direction of the long side faces of the rechargeable batteries to the cooling medium path. In the thus constituted battery pack, the rechargeable batteries are cooled by flow of the cooling medium, and a temperature variation between the cells in each of the rechargeable batteries is reduced by cooling through the heat pipe. Accordingly, a variation in SOC between the cells is restrained to improve the lifetime of the rechargeable battery.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIGS. 1A and 1B are views showing a cooling device of a battery pack according to a first embodiment of the present invention, where

FIGS. 5A and 5B are views showing a cooling device of a battery pack according to a second embodiment of the invention, where

FIGS. 8A and 8B are views showing a cooling device of a battery pack according to a third embodiment of the invention, where

FIGS. 10A and 10B are views showing a conventional cooling device of a battery pack, where

DETAILED DESCRIPTION OF THE PREFERRED EMBODIMENTS

First Embodiment

Hereinafter, a cooling device of a battery pack according to a first embodiment of the present invention will be described with reference to FIGS. 1A to 4.

Figure 1A:
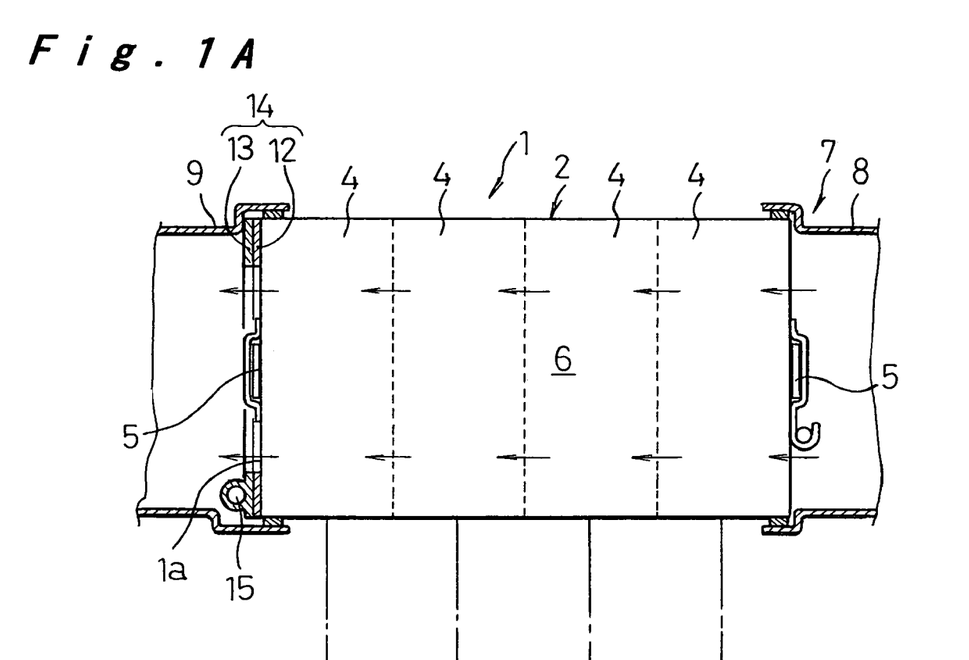
FIG. 1A is a longitudinal sectional front view showing a schematic structure thereof.
Figure 1B:
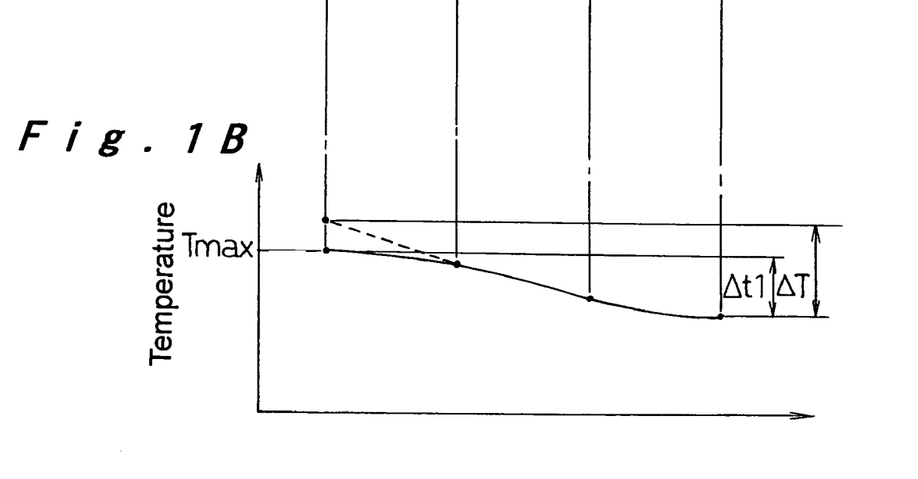
FIG. 1B is a view showing a temperature profile over cells in a rechargeable battery.
Figure 2:
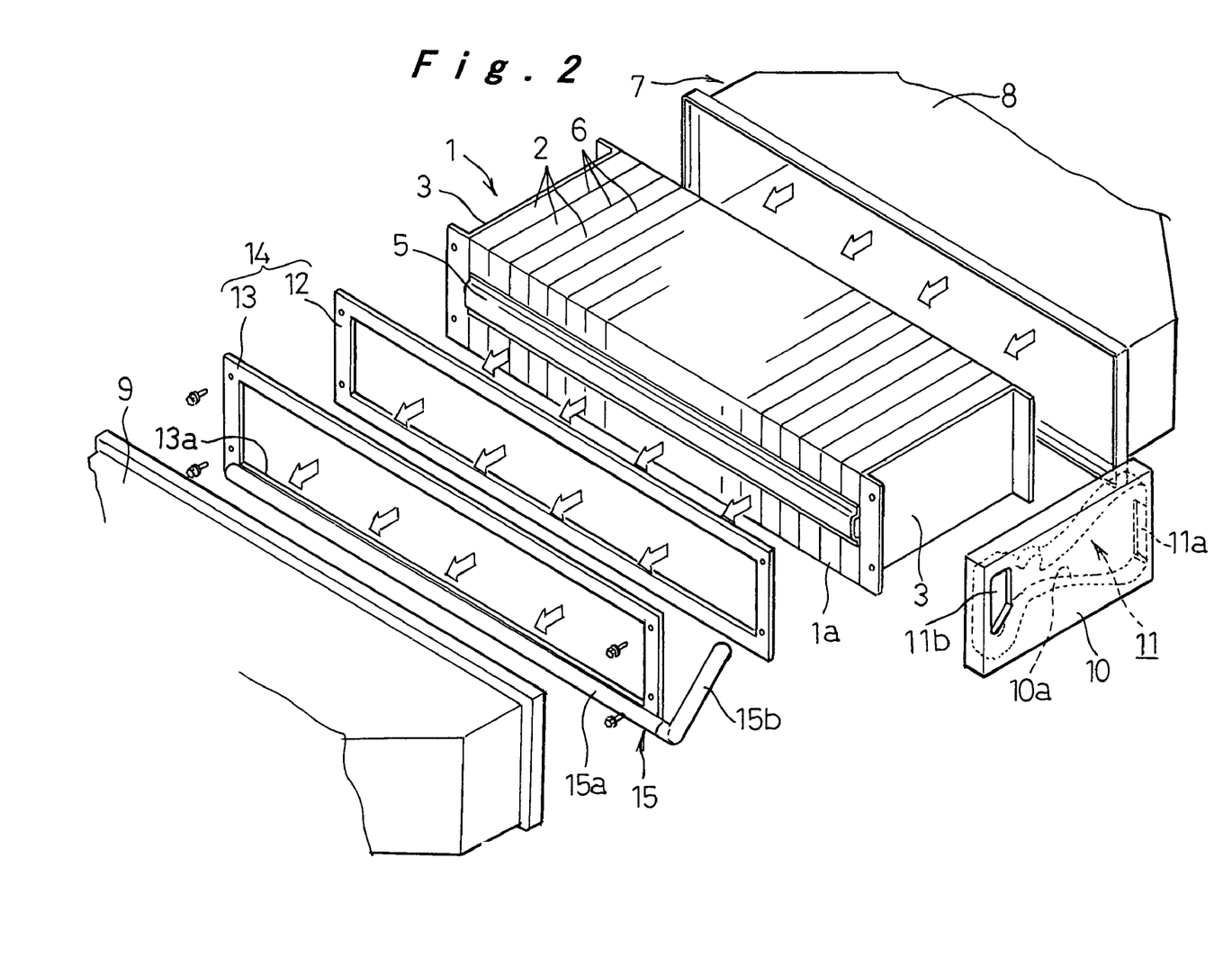
FIG. 2 is an exploded perspective view of the cooling device of the battery pack according to the first embodiment.

In FIGS. 1A, 1B, and 2, a battery pack 1 serves as a driving power source for electric vehicles including a hybrid car. Ten to thirty rechargeable batteries 2 are arranged in parallel. A pair of end plates 3 are provided at both ends of the rechargeable batteries 2 in an aligning direction so as to interpose the rechargeable batteries 2 therebetween. Then, the rechargeable batteries 2 are integrally fixed by a binding member (not shown) to constitute the battery pack 1.

Each of the rechargeable batteries 2 is constituted as a battery module having the following structure. Each of the rechargeable batteries 2 has a flat and prismatic shape with long side faces whose horizontal length is larger than their height. A plurality of cells 4 (in the illustrated example, four cells) are arranged in a longitudinal direction of the long side faces of the rechargeable battery 2. At the same time, the cells 4 are connected in series so as to be integrated, thereby constituting the rechargeable battery 2. Each of the cells 4 is constituted by housing an electrode plate assembly and an electrolyte solution serving as a electric power generating element in a cell case made of a metal which provides high cooling performance.

The battery pack 1 generates a predetermined output voltage by serially connecting connection terminals (not shown) provided at both ends of the rechargeable batteries 2 through bus bars 5. Moreover, cooling medium paths 6 are provided between the long side faces of the rechargeable batteries 2. A cooling medium feeding device 7 is provided so as to feed air, which is taken in from the interior of a vehicle as a cooling medium, from one end of the battery pack 1 in a horizontal direction in FIG. 1A to the cooling medium paths 6. The cooling medium feeding device 7 includes: a feeding hood 8 for feeding a cooling medium to each of the cooling medium paths 6; and an exhaust duct 9 for exhausting the cooling medium flowing out of each of the cooling medium paths 6.

Figure 3:
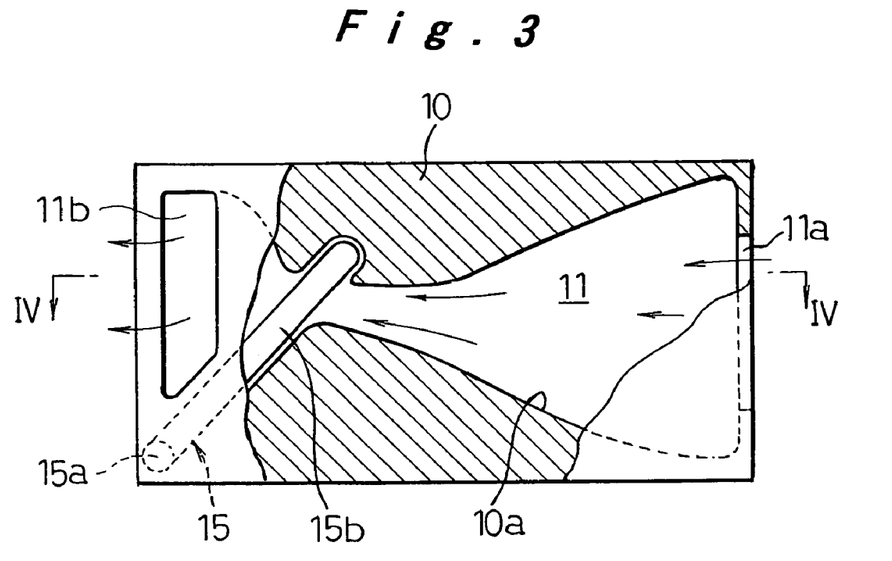
FIG. 3 is a partial sectional front view showing an external cooling medium path according to the first embodiment.
Figure 4:
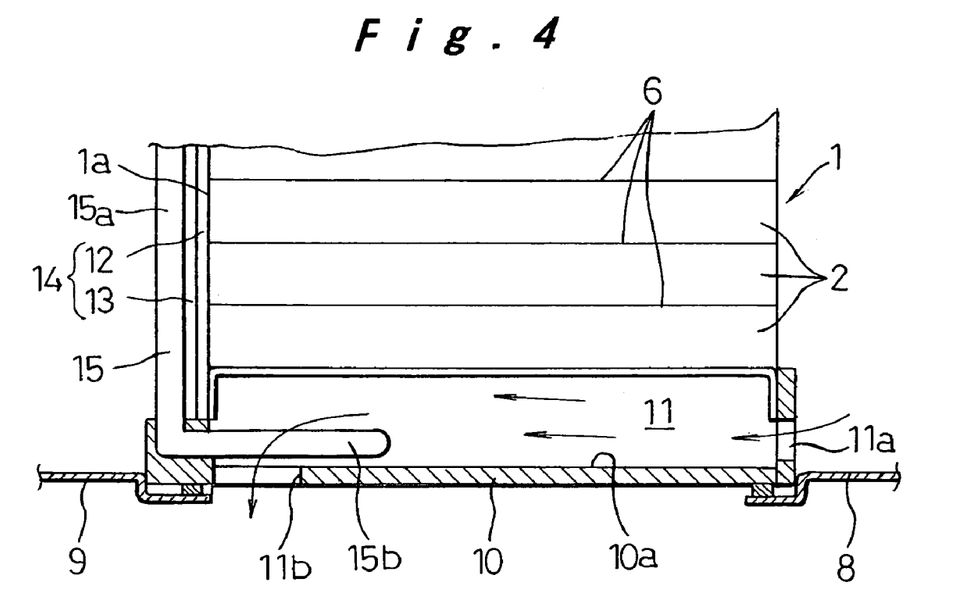
FIG. 4 is a cross-sectional view taken along the line IV-IV in FIG. 3.

On the outer face of one of the end plates 3, a path formation member 10 made of a foamed heat insulating material and having a recessed portion 10a is attached as shown in FIGS. 2 to 4. An external cooling medium path 11 is formed between the recessed portion 10a and the end plate 3. An open end 11a of the external cooling medium path 11 is exposed in the feeding hood 8, whereas the other open end 11b is externally exposed just before the exhaust duct 9.

A frame-shaped thermally conductive member 14 including an insulating thermally conductive sheet 12 and a metal frame 13 is attached to an end face 1a of the battery pack 1 on the downstream side in a flow direction of the cooling medium. An end 15a of a heat pipe 15 is provided along a lower frame portion 13a of the metal frame 13 so as to be integrally attached and thermally connected thereto. The other end 15b of the heat pipe 15 is bent in an L-shape and is placed in the external cooling medium path 11 so as to be cooled by the cooling medium flowing therethrough. The end 15a serves as an endothermic portion, whereas the other end 15b serves as a heat dissipating portion. As shown in FIG. 3, the external cooling medium path 11 is constituted to have a reduced sectional area of the path at the end 15b of the heat pipe 15 so as to increase a flow rate of the cooling medium at the end 15b. With such a structure, a thermal conduction efficiency of the heat pipe 15 is improved. Furthermore, an angle of inclination of the end 15b is set so as to improve a thermal conduction efficiency with the cooling medium.

Examples of the insulating thermally conductive sheet 12 includes one including a base film carrying a silicone type or non-silicone type thermally conductive resin layer (for example, a "thermally conductive HT sheet" fabricated by Nitto Shinko Corporation), a sheet-type silicone gel containing a thermally conductive ceramic dispersed therein, and one including a base material made of fiber glass carrying such a sheet-type silicone gel.

According to the above structure, the cooling medium feeding device 7 makes the cooling medium flow through the cooling medium paths 6 provided between the rechargeable batteries 2, 2 so as to cool each of the rechargeable batteries 2. The entire battery pack 1 is efficiently cooled in a compact and inexpensive structure as compared with the case where the entire battery pack 1 is cooled by the heat pipe 15. Furthermore, the downstream side in the flow direction of the cooling medium where the cooling performance may otherwise be lowered is cooled through the heat pipe 15. Accordingly, the entire battery pack 1 is uniformly cooled.

In particular, each of the rechargeable batteries 2 is composed of a plurality of the cells 4 arranged in parallel in the longitudinal direction of the long side faces of the rechargeable battery 2. In addition, the cooling medium paths 6 are formed between the long side faces of the rechargeable batteries 2 so that the cooling medium passes from one end of the rechargeable battery 2 in the longitudinal direction toward the other end. Accordingly, a height of the cross section of the battery pack 1 is approximately equal to a height of the rechargeable battery 2, thereby achieving a compact structure.

Furthermore, the heat is conducted from the end face 1*a* of the battery pack 1 on the downstream side through the thermally conductive member 14 to the end 15*a* of the heat pipe 15 so that the heat is cooled at the end 15*b* of the heat pipe 15 by the cooling medium flowing through the external cooling medium path 11. As a result, the end face 1*a* of the battery pack 1 is efficiently cooled. Moreover, since the external cooling medium path 11 is constituted by the path formation member 10 made of a foamed heat insulating material attached on the outer face of the end plate 3. Thus, the end 15*b* of the heat pipe 15 is cooled in a lightweight and inexpensive structure.

Moreover, since the thermally conductive member 14 is composed of the insulating thermally conductive sheet 12 and the metal frame 13 to which the heat pipe 15 is attached, the thermally conductive member 14 can be applied to the first rechargeable battery 2 which uses a metal battery case to enhance the cooling performance. Thus, extremely high cooling performance is obtained to improve an output characteristic and a lifetime characteristic. It is apparent that the insulating thermally conductive sheet 12 is not required if the outer faces of the battery cases of the rechargeable batteries 2 or those of the cells 4 are made of an insulating material.

As described above, a temperature of the cell 4 on the most downstream side in the flow direction of the cooling medium, which has the highest temperature, is effectively decreased as indicated in a solid line in FIG. 1B, as compared with a temperature profile of the cell 4 without cooling with the heat pipe 15 as indicated with a broken line. Consequently, a temperature variation between the cells 4, 4 in the rechargeable battery 2 is reduced from $\Delta T$ to $\Delta t1$. At the same time, the maximum temperature Tmax of the cell 4 in the battery pack 1 is decreased. In this manner, a variation in SOC between the cells 4, 4 is restrained and the maximum temperature Tmax is decreased, whereby a lifetime of the battery pack 1 is improved.

Second Embodiment

A second embodiment of a cooling device for a battery pack according to the present invention will now be described with reference to FIGS. 5A to 7. The same components as those of the first embodiment are denoted by the same reference numerals, and the description thereof is herein omitted; only differences from the first embodiment will be described.

In the second embodiment, the thermally conductive member 14 including the insulating thermally conductive sheet 12 and the metal plate 13 is attached to the downstream side of a side face 1*b* of the battery pack 1 (in the illustrated example, a lower face of the battery pack 1) in the flow direction of the cooling medium. The side face 1*b* extends along the flow direction of the cooling medium in the battery pack 1 and is adjacent to the side faces on which the end faces 3 are provided. The one end 15*a* of the heat pipe 15 is integrally attached and thermally connected to the thermally conductive member 14, whereas the other end 15*b* of the heat pipe 15 is placed in the external cooling medium path 11 formed between the end plate 3 and the path formation member 10 attached on the outer face of the end plate 3. A heat insulating material 16 is attached to the upstream side of the lower face 1*b* of the battery pack 1 in the flow direction of the cooling medium.

In the illustrated example, the heat insulating material 16 is integrally formed with the path formation member 10. In addition, the heat insulating material 16 covers the thermally conductive member 14, the outer face of the end 15*a* of the heat pipe 15, and the outer face of the end plate 3 provided on the opposite side of the end plate 3 to which the path formation member 10 is attached. The other open end 11*b* of the external cooling medium path 11 is exposed in the exhaust duct 9.

According to the above-described structure, the heat dissipation from the cell 4 on the upstream side in the flow direction of the cooling medium is restrained by the heat insulating material 16, while the heat is cooled by the cooling medium passing through the external cooling medium path 11 through the thermally conductive member 14 and the heat pipe 15 on the downstream side.

Figure 5A:
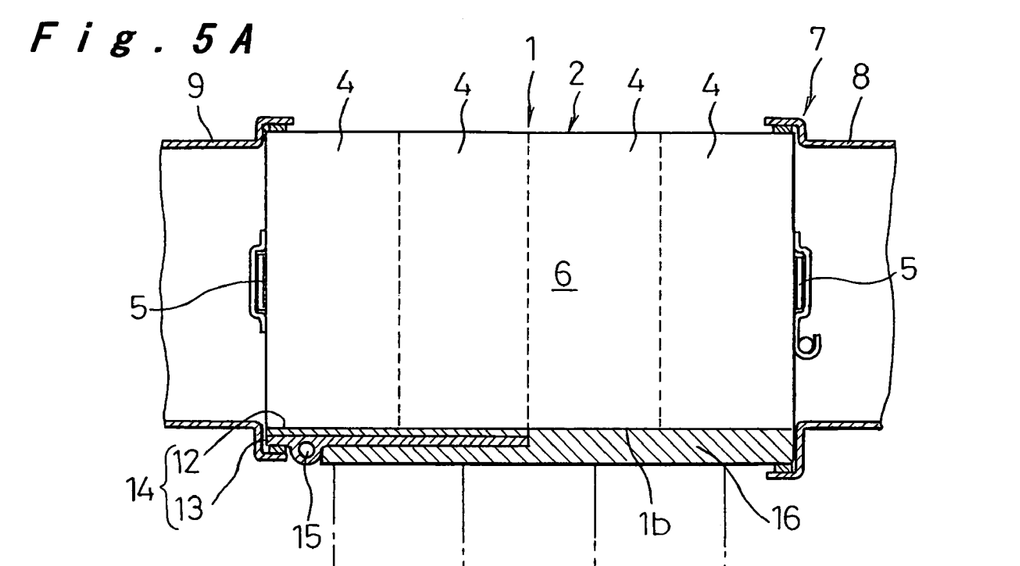
FIG. 5A is a longitudinal sectional front view showing a schematic structure thereof.
Figure 5B:
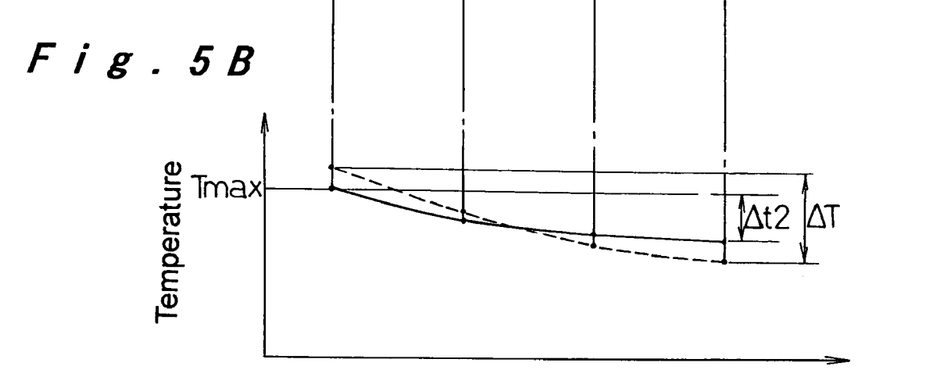
FIG. 5B is a view showing a temperature profile over cells in a rechargeable battery.
Figure 6:
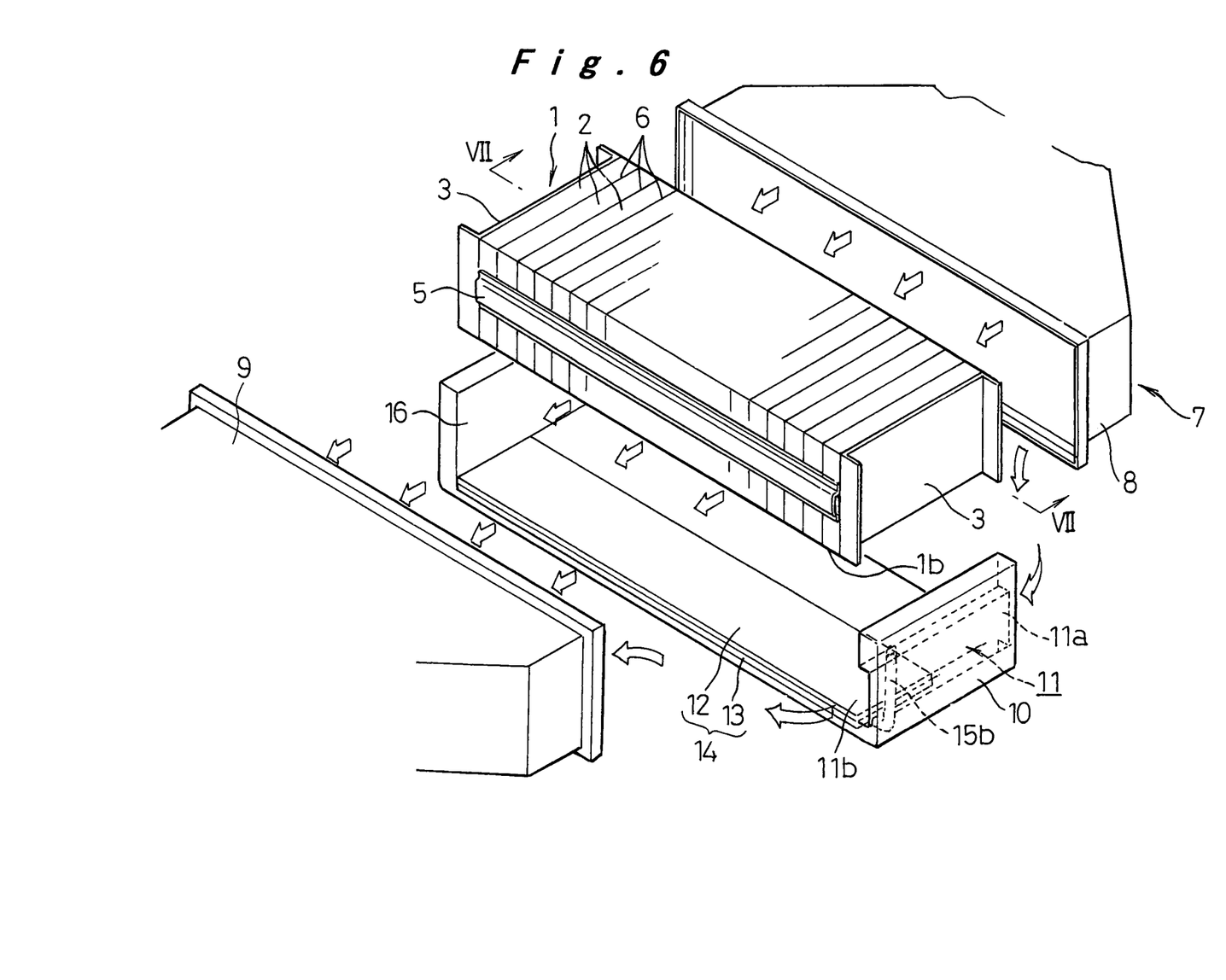
FIG. 6 is an exploded perspective view of the cooling device of the battery pack according to the second embodiment.
Figure 7:
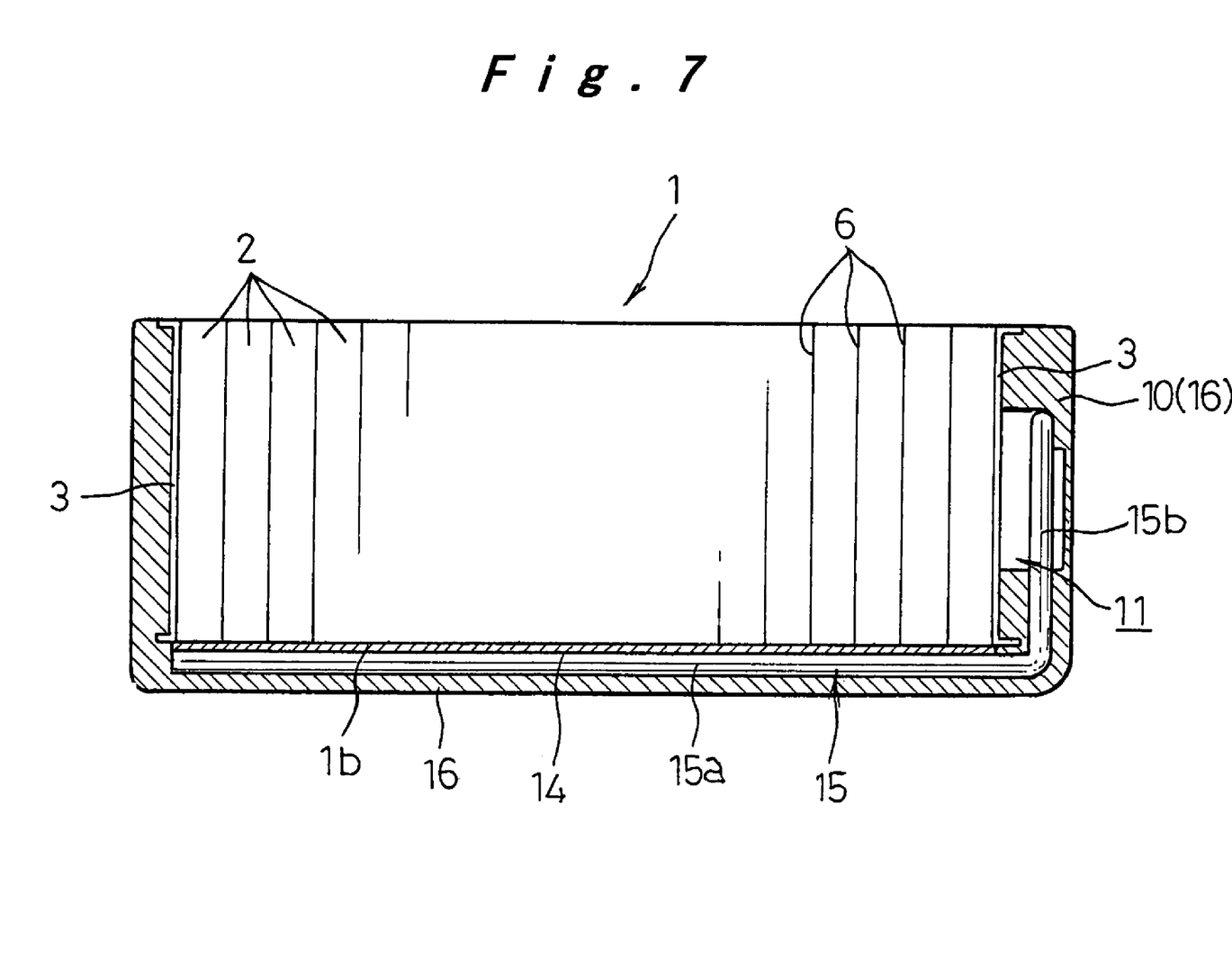
FIG. 7 is a cross-sectional view taken along the line VII-VII in FIG. 6.

As a result, as shown in FIG. 5B, a temperature variation between the cells 4, 4 in the rechargeable battery 2 is reduced to $\Delta t2$ that is smaller than $\Delta t1$ obtained in the first embodiment. Accordingly, a variation in SOC between the cells 4, 4 is restrained while the maximum temperature Tmax is lowered to improve a lifetime of the battery pack 1.

Third Embodiment

Figure 8A:
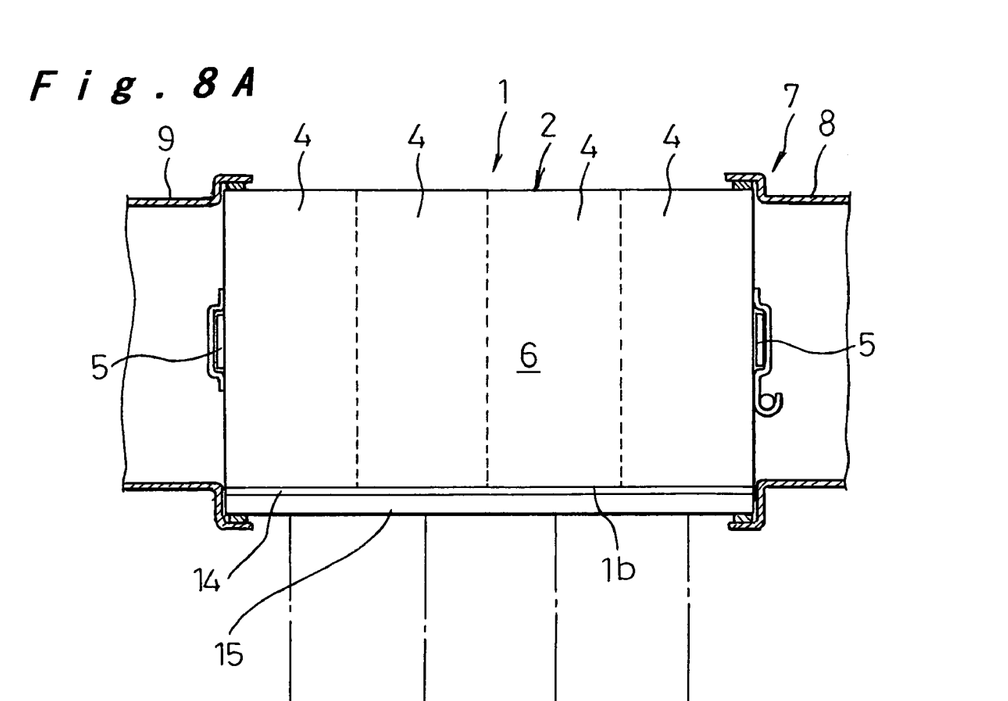
FIG. 8A is a longitudinal sectional front view showing a schematic structure thereof.

A third embodiment of a cooling device for a battery pack according to the present invention will now be described with reference to FIGS. 8A to 9.

In this third embodiment, the thermally conductive member 14 including the insulating thermally conductive sheet 12 and the metal plate 13 is attached to the nearly entire side face 1*b* of the battery pack 1 (in the illustrate example, a lower face of the battery pack 1). The side face 1*b* extends along the flow direction of the cooling medium and is adjacent to the side faces on which the end plates 3 are provided. One or a plurality of heat pipes 15 are fixed to the metal plate 13 along the flow direction of the cooling medium.

According to the above structure, the downstream side of the battery pack 1 in the flow direction of the cooling medium is also cooled by cooling derived from the upstream side, so that a temperature profile is made uniform between the upstream side and the downstream side in the flow direction of the cooling medium.

Figure 8B:
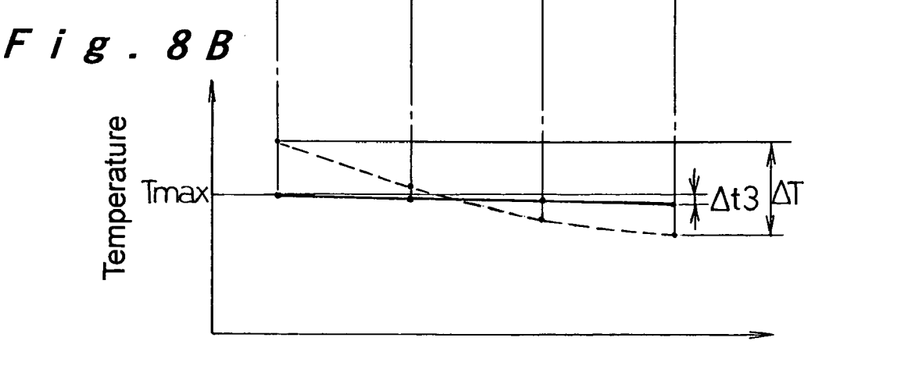
FIG. 8B is a view showing a temperature profile over cells in a rechargeable battery.
Figure 9:
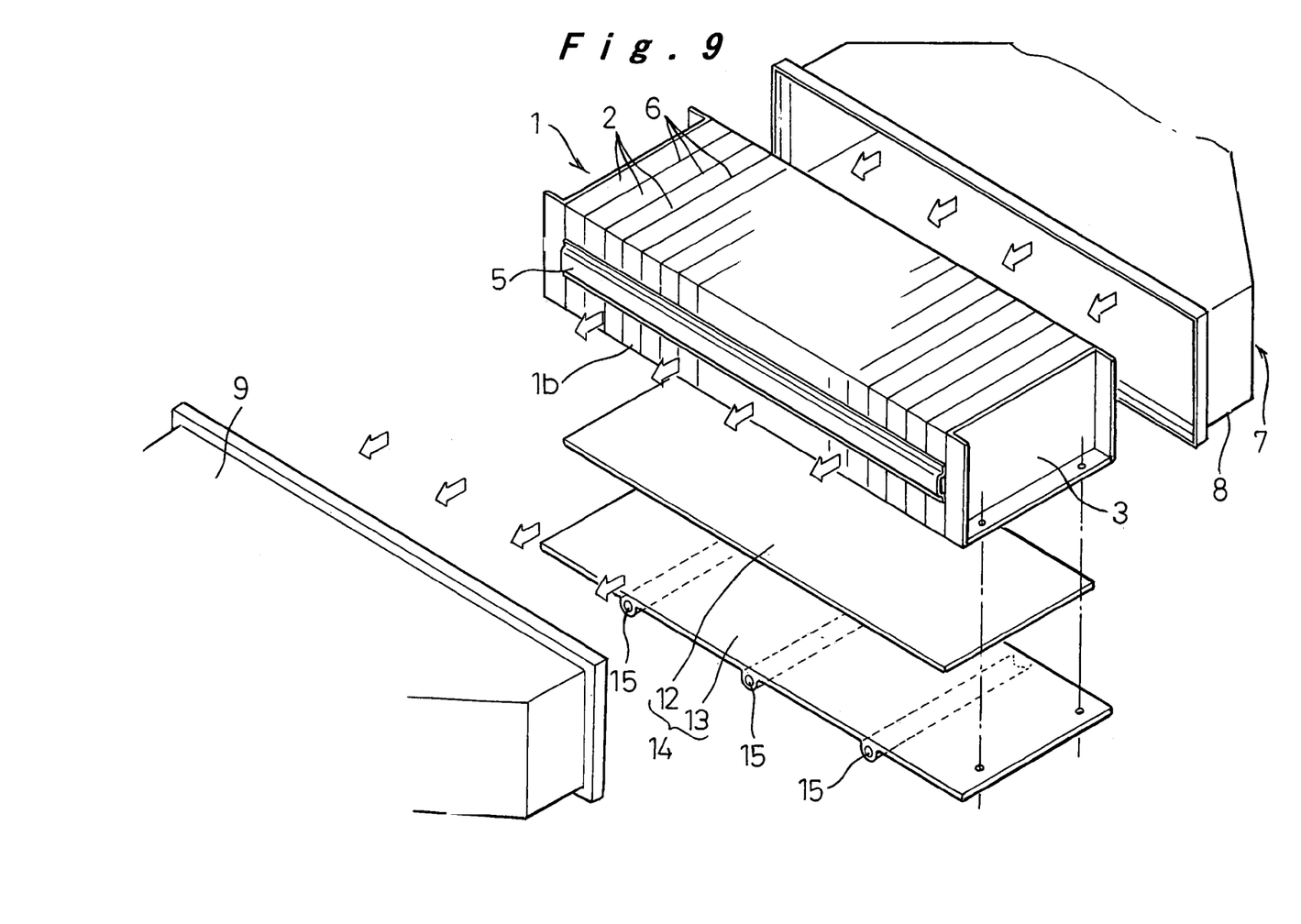
FIG. 9 is an exploded perspective view of the cooling device of the battery pack according to the third embodiment.

As a result, as shown in FIG. 8B, a temperature variation between the cells 4, 4 in the rechargeable battery 2 is reduced to $\Delta t3$ that is smaller than $\Delta t1$ obtained in the first embodiment and $\Delta t2$ obtained in the second embodiment. Accordingly, a variation in SOC between the cells 4, 4 is restrained. Moreover, since additional cooling by the cooling medium flowing through the external cooling medium path 11 by using the heat pipe 15 is not performed, a mean temperature of the entire battery pack 1 is decreased to a lesser extent in comparison with the first and second embodiments. However, since much more averaging effect is obtained, the maximum temperature Tmax is decreased to improve a lifetime of the battery pack 1.

According to a cooling device for a battery pack of the present invention, the cooling medium is made to flow through the cooling medium paths between the rechargeable batteries in the battery pack so as to cool each of the rechargeable batteries. As a result, the battery pack is cooled in a compact and inexpensive structure. In addition, the downstream side in the flow direction of the cooling medium where cooling performance may otherwise be lowered is cooled through the heat pipe, so that the entire battery pack is uniformly cooled.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A cooling device for a battery pack including a plurality of rechargeable batteries arranged in parallel so as to interpose a cooling medium path therebetween, comprising:
    a cooling medium feeding device for feeding a cooling medium to the cooling medium path in the battery pack;
    a heat pipe having a first end that is thermally connected to a downstream side of the battery pack in a flow direction of the cooling medium and a second end; and
    an external cooling medium path formed outside the battery pack, wherein the second end of the heat pipe is exposed in the external cooling medium path.

2. The cooling device for a battery pack according to claim 1, wherein
    the battery pack is configured such that the plurality of rechargeable batteries, each of which is a prismatic battery having rectangular long side faces and composed of a plurality of cells arranged along a longitudinal direction of the long side faces of the rechargeable battery, are arranged in parallel so as to interpose the cooling medium path between the long side faces of the rechargeable batteries, and
    the cooling medium feeding device feeds the cooling medium along the longitudinal direction of the long side faces of the rechargeable batteries to the cooling medium path.

3. The cooling device for a battery pack according to claim 1, wherein
    a thermally conductive member is attached to the downstream side of the battery pack in the flow direction of the cooling medium; and
    the first end of the heat pipe is fixed to the thermally conductive member, whereas the second end of the heat pipe is exposed in a flow path of the cooling medium fed by the cooling medium feeding device.

4. The cooling device for a battery pack according to claim 3, wherein
    the thermally conductive member is attached to an end face of the battery pack on the downstream side in the flow direction of the cooling medium; and
    the external cooling medium path is formed outside one of end plates provided at both ends of the battery pack in a direction in which the rechargeable batteries are arranged.

5. The cooling device for a battery pack according to claim 3, wherein
    the thermally conductive member is attached to the downstream side of a side face of the battery pack in the flow direction of the cooling medium, the side face extending along the flow direction of the cooling medium and being adjacent to side faces at both ends of the battery pack in a direction in which the rechargeable batteries are arranged;
    a heat insulating material is attached to the upstream side of the side face in the flow direction of the cooling medium; and
    the external cooling medium path is formed outside one of end plates provided at both ends of the battery pack in the direction in which the rechargeable batteries are arranged.

6. The cooling device for a battery pack according to claim 4 wherein
    the external cooling medium path is made of a foamed heat insulating material attached to an outer face of one of the end plates.

7. The cooling device for a battery pack according to claim 2 wherein
    a thermally conductive member is attached to a nearly entire side face of the battery pack, the side face extending along the flow direction of the cooling medium and being adjacent to side faces at both ends of the battery pack in a direction in which the rechargeable batteries are arranged; and
    the heat pipe is fixed to the thermally conductive material along the flow direction of the cooling medium.

8. The cooling device for a battery pack according to claim 3 wherein
    the thermally conductive member comprises: a metal plate to which the heat pipe is attached; and an insulating thermally conductive sheet interposed between the metal plate and the rechargeable batteries.

9. The cooling device for a battery pack according to claim 5, wherein
    the external cooling medium path is made of a foamed heat insulating material attached to an outer face of one of the end plates.

10. The cooling device for a battery pack according to claim 7, wherein
    the thermally conductive member comprises: a metal plate to which the heat pipe is attached; and an insulating thermally conductive sheet interposed between the metal plate and the rechargeable batteries.

* * * * *